(12) United States Patent
Kim

(10) Patent No.: US 7,145,609 B2
(45) Date of Patent: Dec. 5, 2006

(54) METHOD AND APPARATUS OF PROCESSING INPUT SIGNALS OF DISPLAY APPLIANCE

(75) Inventor: Min Kyung Kim, Daejeon (KR)

(73) Assignee: LG Electronics Inc., Seoul (KR)

( * ) Notice: Subject to any disclaimer, the term of this patent is extended or adjusted under 35 U.S.C. 154(b) by 524 days.

(21) Appl. No.: 10/347,516

(22) Filed: Jan. 21, 2003

(65) Prior Publication Data

US 2003/0140352 A1 Jul. 24, 2003

(30) Foreign Application Priority Data

Jan. 21, 2002 (KR) .................... 10-2002-0003355

(51) Int. Cl.
H04N 5/268 (2006.01)
H04N 5/46 (2006.01)

(52) U.S. Cl. .................. 348/705; 348/706; 348/552; 348/14.04; 725/141

(58) Field of Classification Search ................ 348/705, 348/706, 552, 553, 555, 722, 558, 14.04, 348/14.11; 725/100, 133, 153, 131, 151, 725/139, 141
See application file for complete search history.

(56) References Cited

U.S. PATENT DOCUMENTS

| | | | | |
|---|---|---|---|---|
| 5,438,375 A | * | 8/1995 | Sasabe et al. ................ | 348/706 |
| 5,898,463 A | * | 4/1999 | Nishiyama .................. | 348/554 |
| 5,917,557 A | * | 6/1999 | Toyoda ........................ | 348/705 |
| 6,118,496 A | * | 9/2000 | Ho .............................. | 348/706 |
| 6,122,018 A | * | 9/2000 | Sugihara et al. ............ | 348/705 |
| 6,133,910 A | * | 10/2000 | Stinebruner .................. | 725/49 |
| 6,226,053 B1 | * | 5/2001 | Cho ............................ | 348/705 |
| 6,486,925 B1 | * | 11/2002 | Ko .............................. | 348/731 |
| 6,490,009 B1 | * | 12/2002 | Asakura ...................... | 348/705 |
| 6,516,467 B1 | * | 2/2003 | Schindler et al. ........... | 725/153 |
| 6,690,431 B1 | * | 2/2004 | Yang et al. ................. | 348/706 |
| 6,781,518 B1 | * | 8/2004 | Hayes et al. ........... | 340/825.72 |
| 6,806,887 B1 | * | 10/2004 | Chernock et al. ........... | 345/629 |
| 6,859,845 B1 | * | 2/2005 | Mate ............................. | 710/5 |
| 6,912,016 B1 | * | 6/2005 | Stumm ........................ | 348/705 |
| 6,961,099 B1 | * | 11/2005 | Takano et al. .............. | 348/705 |
| 2002/0194596 A1 | * | 12/2002 | Srivastava ................... | 725/37 |
| 2003/0033612 A1 | * | 2/2003 | Schwalb ..................... | 725/140 |

* cited by examiner

Primary Examiner—David Ometz
Assistant Examiner—Jean W. Désir
(74) Attorney, Agent, or Firm—Fleshner & Kim, LLP

(57) ABSTRACT

Disclosed are a method and apparatus of processing input signals of a display appliance having a plurality of external input terminals and connected to a set top box with a plurality of external input terminals. The method comprises the steps of: detecting a connecting state to the set top box, a signal receiving state from the set top box, a signal receiving state via the external input terminals of the display appliance; selecting and outputting any one of signals supplied from the set top box and signals supplied via external input terminals of the display appliance; and during outputting the selected signal, if a user requests to output a signal inputted from any one of external input terminals of the set top box and the display appliance, selecting and outputting the selected signal.

28 Claims, 3 Drawing Sheets

METHOD AND APPARATUS OF PROCESSING INPUT SIGNALS OF DISPLAY APPLIANCE

BACKGROUND OF THE INVENTION

1. Field of the Invention

The present invention relates to a display appliance, and more particularly, to a method and apparatus of processing input signals of a display appliance.

2. Description of the Related Art

With advances in technology, the kinds of input signals that can be processed by a display appliance become diversified. Consequently, display appliances include several external input terminals, such as a connecting terminal for a set top box, an audio-video signal input terminal, a DVD connecting terminal, a PC connecting terminal, etc.

The set top box supplies AV signals inputted from various signal sources, such as a personal computer, a DVD player and a cable/wireless broadcasting receiver, to the display appliance via the set top box connecting terminal.

The display appliance may directly receive various input signals from the external input terminal, or receive the input signals via the set top box.

In general, the display appliance selects any one of the input signals depending upon the connecting state to the set top box, and will now be described in brief.

If the display appliance is not connected to the set top box or does not receive the signal from the set top box, the display appliance selectively outputs any one of the signals inputted from the external input terminals. Otherwise, if it receives the signal from the set top box, the display appliance selectively outputs any one of the input signals inputted from the set top box.

Consequently, a problem exists in that during the receipt of another signal from the set top box, even though the signal is directly received from the external input terminal, the conventional display appliance cannot output the signal.

This interrupts a portion of various signals regardless of the intention of a user, thereby dissatisfying the user. In addition, an inexperienced user misconceives the nonoutput of the signal inputted from the external input terminal as the misoperation of the display appliance, thereby decreasing the reliability of the article in the user's mind.

SUMMARY OF THE INVENTION

Accordingly, the present invention is directed to a method and apparatus of processing input signals of a display appliance that substantially obviate one or more problems due to the limitations and disadvantages of the related art.

It is an object of the present invention to provide a method and apparatus of processing input signals of a display appliance in which an external input signal may be selected and outputting regardless of whether or not a display appliance receives the signal from a set top box, thereby providing the user with convenience of use.

Another object of the present invention is to provide a method and apparatus of processing input signals of a display appliance in which an input signal is selected depending upon the connecting state to a set top box and the signal receiving state from the set top box, hereby maintaining consistency with a conventional method of selecting the input signal.

To achieve these objects and other advantages and in accordance with the purpose of the invention, as embodied and broadly described herein, a method of processing input signals of a display appliance having a plurality of external input terminals and connected to a set top box with a plurality of external input terminals is provided. The method comprises the steps of: a) detecting a connecting state to the set top box, a signal receiving state from the set top box, and a signal receiving state via the external input terminals of the display appliance; b) selecting and outputting any one of signals supplied from the set top box and signals supplied via external input terminals of the display appliance; and c) during the output of the selected signal, if a user requests to output a signal inputted from any one of the external input terminals of the set top box and the display appliance, selecting and outputting the selected signal According to another aspect of the present invention, an apparatus of processing input signals of a display appliance having a plurality of external input terminals and connected to a set top box with a plurality of external input terminals is provided. The apparatus comprises an AV switch for selecting and outputting any one of signals inputted from the set top box and the external input terminals of the display appliance; a video/image processor for processing the signal selected and outputted by the AV switch to convert a signal that is able to be outputted; a display for receiving an output of the video/image processor to display the output; an operating unit for providing a user with an interface; and a micro computer for selecting and outputting any one of signals supplied from the set top box and signals supplied via external input terminals of the display appliance, after a connecting state to the set top box and a signal receiving state from the set top box are detected, and during the output of the selected signal, if a user requests to output a signal inputted from any one of the external input terminals of the set top box and the display appliance, controlling the set top box, the AV switch and the video/image processor to output the selected signal.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE PREFERRED EMBODIMENT

Reference will now be made in detail to the preferred embodiment of the present invention, an example of which is illustrated in the accompanying drawings.

Figure 1:
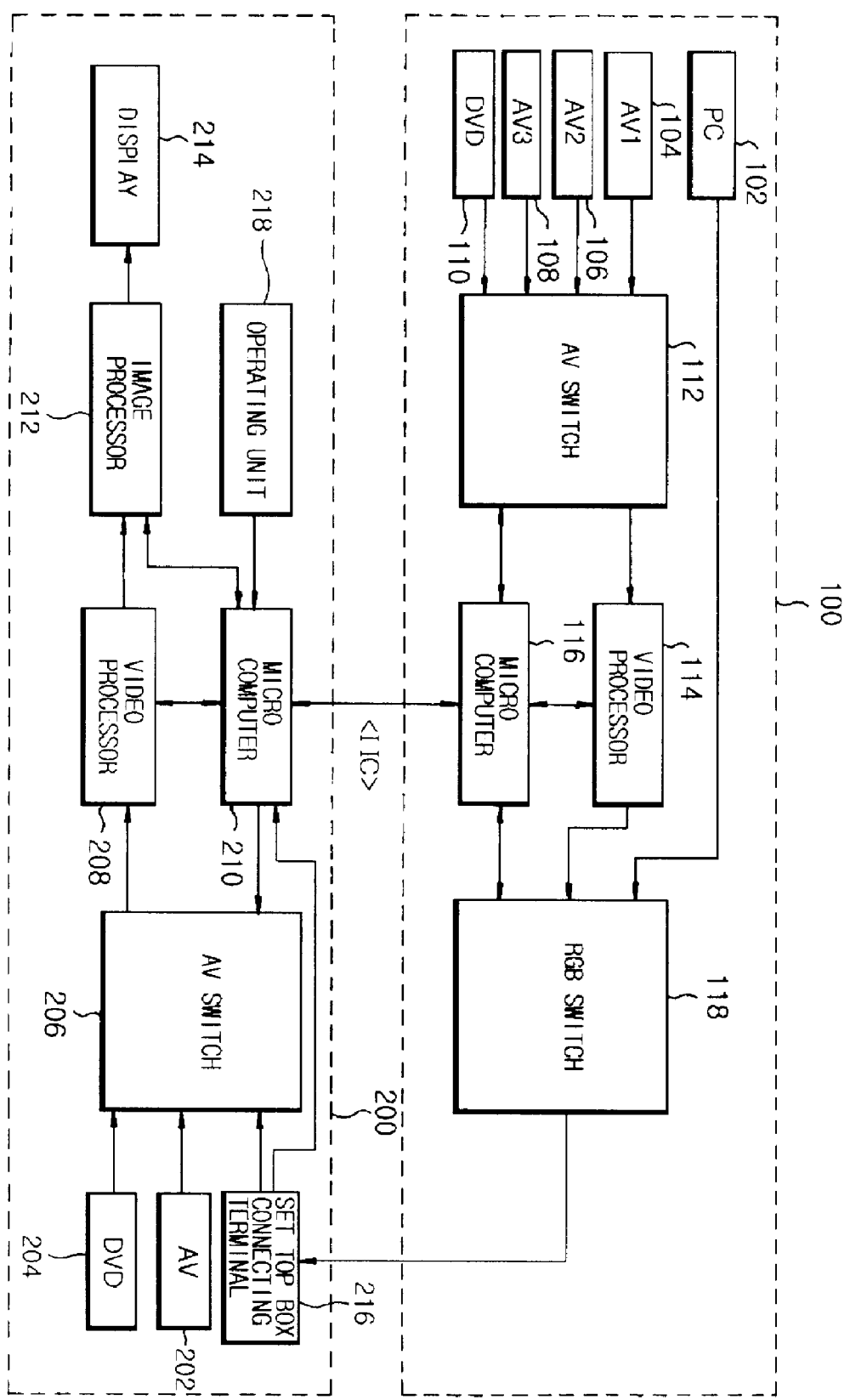
FIG. 1 is a schematic block diagram of a display appliance with a set top box employable in the present invention.

The construction of the display appliance with a set top box employable in the present invention will now be described with reference to FIG. 1.

The set top box 100 includes several external input terminals such as PC, AV1, AV2, AV3 and DVD, which are respectively designated by reference numerals 102 to 110. The set top box 100 receives various signals, such as a cable/wireless broadcasting signal, a DVD reproducing signal and so forth, via the AV1 104, AV2 106, AV3 108 and DVD 110 among the input terminals. These signals are supplied to an AV switch 112.

The AV switch 112 selects any one of input signals supplied via AV1 104, AV2 106, AV3 108 and DVD 110 in accordance with the control of a micro computer 116, and supplies the selected signal to a video processor 114. The video processor 114 processes the input signal supplied from the AV switch 112 to output the processed signal to an RGB switch 118.

The external input terminal (i.e., PC 102) receives an image signal from a computer to output it to the RGB switch 118 in accordance with the control of the micro computer 116. The RGB switch 118 selects any one of signals supplied from the computer and the video processor 114 to output the selected signal to a display appliance 200.

The micro computer 116 of the set top box 100 controls the AV switch 112 and the RGB switch 118 in accordance with the control of a controller 210 provided in the display appliance 200, as well as generally controlling the set top box 100, thereby supplying the input signal wanted by a user to the AV switch 206 of the display appliance.

The display appliance 200 includes external input terminal (i.e., AV 202 and DVD 204) and a set top box connecting terminals 216. Signals inputted from the external input terminal (i.e., AV 202 and DVD 204) and the set top box connecting terminal 216 are supplied to the AV switch 206. In particular, the set top box connecting terminal 216 detects the connecting state to the set top box 100 and then supplies the detected result to the micro computer 210. The connecting state is detected based on the current capacity of the corresponding connecting terminal. Such a detecting method is widely known in the art, and the detailed description thereof will be omitted.

The AV switch 206 selects any one of the signals inputted from the external input terminal (i.e., AV 202 and DVD 204) and the set top box connecting box 216 to output the selected signal to the video processor 208. The video processor 208 processes the signal provided by the AV switch 206 to output the processed signal to an image processor 212.

The image processor 212 processes the signal provided by the micro computer 210 or the video processor 208 to output the processed signal to the display 214. The display 214 displays the signal outputted from the video processor 208, and a DVD module may be used as the display 214.

The micro computer 210 of the display appliance 200 generally controls the display appliance 200, as well as controlling the AV switch 112 and the RGB switch 118 by use of the micro computer 116 of the set top box 100 according to the preferred embodiment of the present invention, as well as controlling the AV switch 206, thereby outputting the signal wanted by the user. In addition, the micro computer 210 controls the AV switch 112, the RGB switch 118 and the AV switch 206 so as to select the input signal in accordance with the connecting state to the set top box 100 and the signal receiving state therefrom, so that the consistency between present and conventional micro computers may be maintained. An operating unit 218 interfaces between the user and the micro computer 210.

Figure 2:
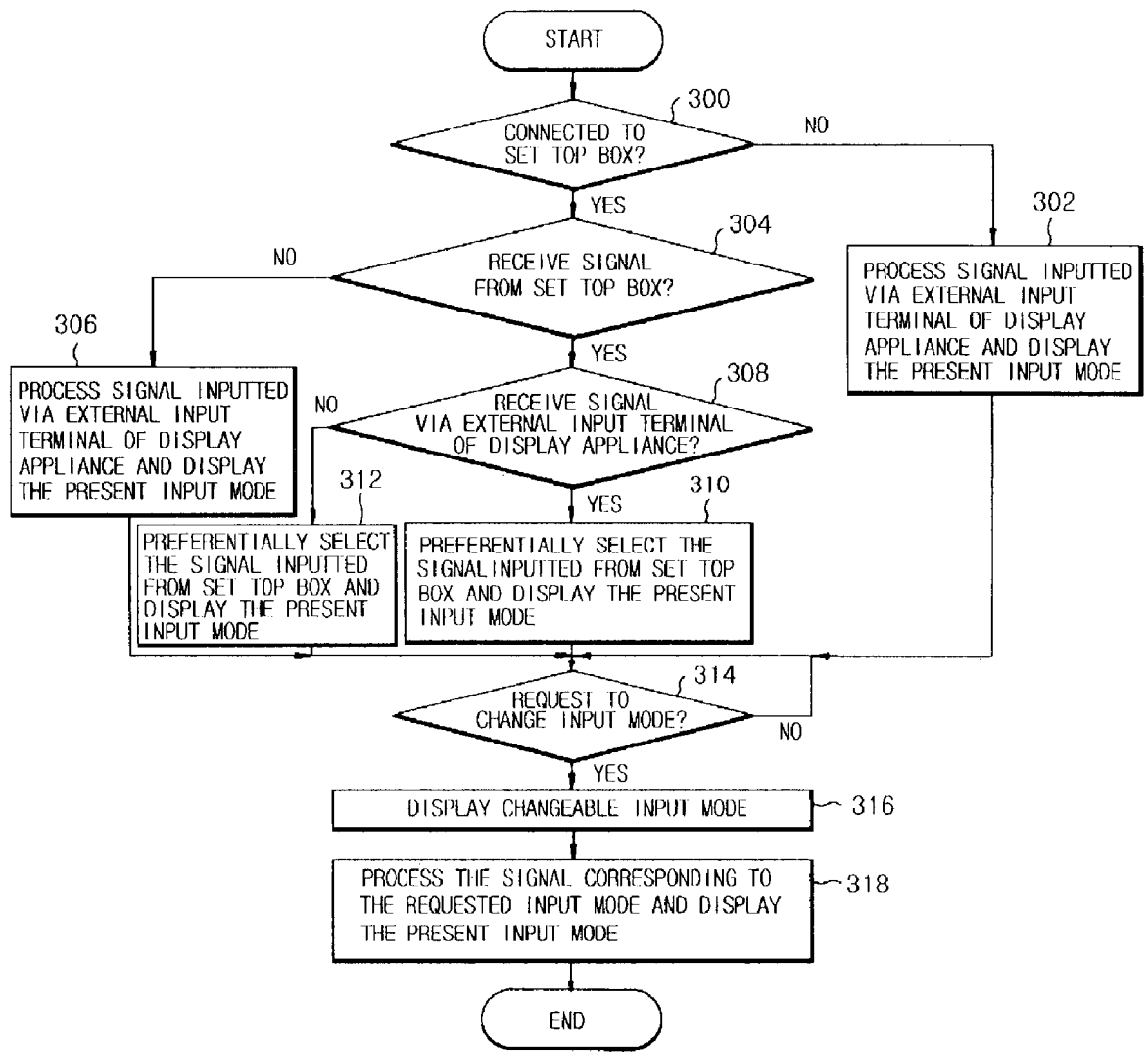
FIG. 2 is a flow chart depicting a method of processing input signals of a display appliance with a set top box according to a preferred embodiment of the present invention.

A method of processing the input signal according to a preferred embodiment of the present invention employable in the display appliance 200 will now be described with reference to FIG. 2.

The micro computer 210 of the display appliance 200 detects the connecting state to the set top box 100 by referring to the detected signal supplied via the set top box connecting terminal 216 (step S300). If the micro computer 210 is not connected to the set top box 100, the micro computer selects and processes any one of the signals inputted from the external input terminals of the display appliance 200 (i.e., AV 202 and DVD 204). The micro computer 210 display the signal to the user over the present input mode through the display 214 (step S302).

Otherwise, if the micro computer 210 is connected to the set top box 100, the micro computer 210 detects whether or not there is receipt of the signal from the set top box 100 (step S304). Receiving the signal from the set top box 100, the micro computer 210 detects whether or not there are any signals received from the external input terminals of the display (i.e., AV 202 and DVD 204) (step S308).

Receiving the signals from the external input terminals of the display appliance 200 and the set top box 100, the micro computer 210 preferentially selects and processes the signal outputted from the set top box 100, and displays the signal to the user over the present input mode through the display 214 (step S310). In case the set top box 100 outputs the signal inputted to the AV1 104 (among the signals inputted via the external input terminals, i.e., AV1, AV2, AV3 and DVD), for example, the micro computer 210 displays 'STB AV1' through an on-screen display (OSD) so as to display the signal to the user over the present input mode. The micro computer 210 of the display appliance 200 may receive the information regarding the input mode of the set top box 100 from the micro computer 116 of the set top box 100 via an interface integrated circuit (IIC).

Otherwise, if the micro computer 210 receives the signals not from the set top box 100 but from the external input terminals of the display appliance 200 (i.e., AV 202 and DVD 204), the micro computer 210 selects and processes any one of the signals inputted from the external input terminals of the display appliance 200 (i.e., AV 202 and DVD 204) (step S306). Further, the micro computer 210 displays the signal to the user over the present input mode through the display 214. In case the set top box 100 outputs the signal inputted to the DVD 204 (among the signals inputted via the external input terminals, i.e., AV 202 and DVD 204), for example, the micro computer 210 displays the 'MNT COMPONENT' through the OSD so as to display the signal to the user over the present input mode.

In the state where the signal is not inputted via the external input terminals of the display appliance 200 (i.e., AV 202 and DVD 204), if the micro computer 210 receives the signal from the set top box 100, the micro computer 210 processes the signal inputted from the set top box 100, and simultaneously displays the signal to the user over the present input mode (step S312).

Figure 3:
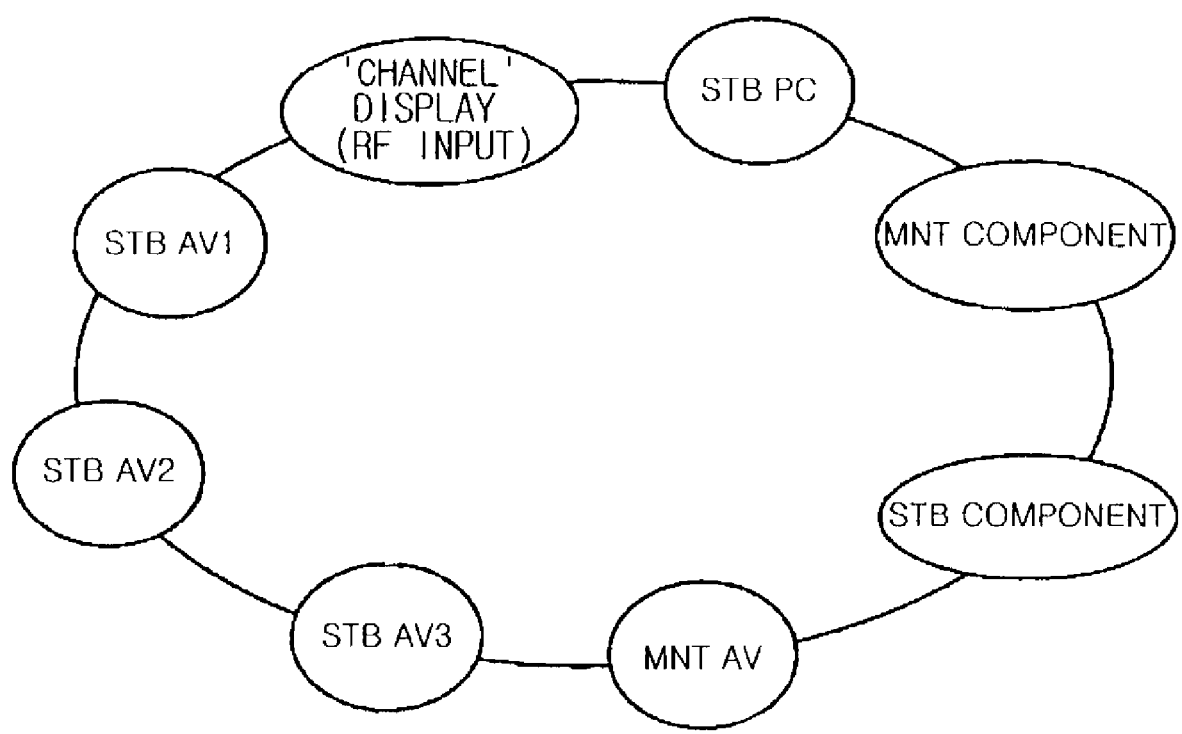
FIG. 3 is a view showing input modes according to a preferred embodiment of the present invention.

At the time the micro computer 210 automatically selects and outputs any one of the signals inputted from the external input terminals of the display appliance 200 (i.e., AV 202 and DVD 204) or the external input terminals of the set top box 100 (i.e., PC 102, AV1 104, AV2 106, AV3 108, and DVD 110), if the user requests the change of the input mode through the operating unit 218 (step S314), the micro computer 210 shows the desired input mode by allowing the user to select the wanted input mode (step S316). The input mode selectable by the user includes, as shown in FIG. 3, STB PC, MNT COMPONENT, STB COMPONENT, MNT AV, STB AV1, STB AV2, STB AV3, and so forth. 'STB PC' means a computer input mode through the set top box 100, 'MNT COMPONENT' means a reproducing input mode of the DVD, CD or cassette tape through the external input terminal of the display appliance 200, 'STB COMPONENT' means a reproducing input mode of the DVD, CD or cassette tape through the set top box 100, 'MNT AV' means the AV signal directly inputted to the display appliance 200, and 'STB AV1' to 'STB AV3' mean AV signals inputted via the set top box 100.

If the user selects the wanted input mode using the operating unit 218 by reference to the displayed input mode, the micro computer 210 controls the AV switch 112 and RGB switch 118 of the set top box 100 and the AV switch 206 of the display appliance 200 so as to selectively output the input signal corresponding to the selected mode. In addition, the micro computer 210 displays the signal to the user over the present input mode through the display 214 (step S318).

With the above description, the present invention may select and output the external input signal regardless of whether or not a signal is received from the set top box, thereby providing the user with convenience of use.

In addition, the present invention selects the input signal depending upon the connecting state to the set top box and the signal receiving state from the set top box, thereby maintaining consistency with the conventional method of selecting the input signal and thus being applicable to the users experienced in the conventional method of use.

The forgoing embodiment is merely exemplary and is not to be construed as limiting the present invention. The present teachings can be readily applied to other types of apparatuses. The description of the present invention is intended to be illustrative, and not to limit the scope of the claims. Many alternatives, modifications, and variations will be apparent to those skilled in the art.

What is claimed is:

1. A method of processing input signals of a display appliance having a plurality of external input terminals and connected to a set top box with a plurality of external input terminals, comprising:
    a) detecting a connecting state to the set top box, a signal receiving state from the set top box, a signal receiving state via the external input terminals of the display appliance;
    b) selecting and outputting any one of signals supplied from the set top box and signals supplied via the external input terminals of the display appliance, wherein selecting and outputting any one of the signals comprises:
        if the signal is inputted from the set top box only, selecting and outputting the signal inputted from the set top box,
        if the signal is not inputted from the set top box and the signals are inputted from the input terminals of the display appliance only, selecting and outputting any one of the signals, and
        if the signals are inputted from the set top box and the input terminals of the display appliance, selecting and outputting the signal inputted from the set top box, and
    c) during outputting the selected signal, if a user requests to output a signal inputted from any one of the external input terminals of the set top box and the display appliance, selecting and outputting the selected signal.

2. The method in claim 1, further comprising displaying an input mode corresponding to the selected signal, whenever the signal is selected and outputted.

3. An apparatus to process input signals of a display appliance having a plurality of external input terminals and connected to a set top box with a plurality of external input terminals, comprising:
    an AV switch to select and output at least one of a signal inputted from the set top box and the external input terminals of the display appliance;
    a video/image processor to process the signal selected and outputted by the AV switch to convert the selected signal to an output signal;
    a display to receive the output signal from the video/image processor to display the output signal;
    an operating unit to provide a user with an interface; and
    a micro computer to select and output any one of signals received from the set top box and from the external input terminals of the display appliance based on a detected connecting state to the set top box and a detected signal receiving state from the set top box, the micro computer to select and output the signal inputted from the set top box when signals are inputted from the set top box and when signals are inputted from the external input terminals of the display apparatus, and during an outputting of the selected signal, if a user requests to output a signal inputted from any one of external input terminals of the set top box and the display appliance, the micro computer to control the set top box, the AV switch and the video/image processor to output the selected signal.

4. The apparatus in claim 3, wherein the micro computer controls:
    when the signal is inputted from the set top box only, selecting and outputting the signal inputted from the set top box; and
    when the signal is not inputted from the set top box and the signals are inputted from the input terminals of the display appliance only, selecting and outputting any one of the signals.

5. The apparatus in claim 3, wherein the micro computer controls the image processor to display an input mode of the inputted signal through an on-screen display, whenever the signal is selected and outputted.

6. A method of processing input signals of a display appliance having a plurality of external input terminals, comprising:
    detecting a connection state of a set top box configured to be coupled to at least one of the plurality of external input terminals and a connection state of at least one external device coupled to a corresponding one of the plurality of external input terminals; and
    selecting and outputting at least one received signal from the set top box and the at least one external device according to at least one of the connection state of the set top box and a user command, wherein when it is determined that the set top box is providing a signal to at least one of the plurality of external input terminals and when it is determined that at least one additional device is providing a signal to at least one of the plurality of external terminals, the signal from the set-top box is selected and outputted.

7. The method of claim 6, wherein the connection state of the set top box and the connection state of the at least one external device comprises at least one of not connected, connected without outputting a signal, and connected and outputting a signal.

8. The method of claim 6, wherein if it is determined that the set top box is connected to at least one of the plurality of external input terminals and is providing a signal, and if it is further determined that no additional devices are providing a signal to the plurality of external terminals, the signal from the set top box is selected and outputted.

9. The method of claim 6, wherein if it is determined that no signal is received from the set top box by at least one of the plurality of input terminals, and that a signal is received from at least one external device coupled to a corresponding one of the plurality of external input terminals, the signal from one of the at least one external device is selected and outputted.

10. The method of claim 9, wherein it is determined that no signal is received from the set top box if no set top box is coupled to at least one of the external input terminals.

11. The method of claim 6, wherein a user can select a signal from among the at least one received signal from the set top box and the signal received from the at least one additional device to be outputted.

12. The method of claim 6, wherein the connection state of the set top box comprises a connecting state to the set top box and a signal receiving state from the set-top box.

13. The method of claim 6, further comprising displaying an input mode corresponding to the selected signal on a display device when the signal is selected and outputted.

14. The method of claim 6, wherein selecting and outputting at least one received signal comprises selecting and outputting a user selected signal if a user requests to output a signal received at any one of the external input terminals.

15. The method of claim 14, wherein selecting and outputting at least one received signal further comprises selecting and outputting the user selected signal from among a plurality of external input terminals of the set top box.

16. A method of processing input signals of a display appliance having a plurality of external input terminals, comprising:
    detecting a connection state of a set top box to be coupled to at least one of the plurality of external input terminals and a connection state of at least one external device to be coupled to a corresponding one of the plurality of external input terminals; and
    selecting and outputting at least one received signal from the set top box and the at least one external device according to at least one of the connection state of the set top box and a user command, wherein selecting and outputting at least one received signal comprises:
        selecting and outputting a signal inputted from the set top box if the signal from the set top box is received and no signal is received from the at least one external device;
        selecting and outputting any one of received signals if no signal is received from the set top box and at least one signal is received from the at least one external device coupled to input terminals; and
        selecting and outputting the signal from the set top box if signals are received from both the set top box and at least one external device coupled to the input terminals.

17. The method of claim 14, wherein a user can select from among any of the received signals, and the user selected signal is outputted without consideration of what other signals are received from the plurality of external input terminals.

18. An signal processing circuit, comprising:
    a plurality of input terminals configured to receive an input from at least one of a set-top box and an external device;
    an AV switch to select and output at least one of a signal inputted from the set top box and the external device; and
    a processor to select, process, and output at least one signal selected and outputted by the AV switch to convert the selected signal to an output signal in accordance with a set top box connecting state, a set top box signal receiving state and a user selection, the processor to select and output the signal received from the set top box when signals are received from the set top box and signals are received from at least one other device by the plurality of input terminals.

19. The signal processing circuit of claim 18, wherein the processor comprises a controller, an image processor, and a video processor, and wherein the processor is configured to control the set top box, the AV switch, and video and image processors to output the selected signal from among the signals inputted from the set top box, the AV device, and the DVD device.

20. The signal processing circuit of claim 19, wherein the set top box comprises a plurality of external input terminals configured to receive an input signal from at least one of an AV device, a DVD device, and a personal computer, and wherein a user can select the input signal from among the plurality of external input terminals.

21. The signal processing circuit of claim 20, wherein the processor is configured to control the set top box to select and output a signal from among the input signals received by the plurality of external input terminals of the set top box.

22. The signal processing circuit of claim 18, wherein the processor is further configured to:
    select and output the signal inputted from the set top box if the set top box signal is received by the plurality of input terminals and no other signals are received from the plurality of input terminals; and
    select and output any one of the signals received by the plurality of input terminals if no signal is received from the set top box and other signals are received by the plurality of input terminals.

23. The signal processing circuit of claim 18, wherein the processor controls the set top box and the AV switch to select and output the signal received from the set top box if signals are received from the set top box and at least one other device by the plurality of input terminals.

24. The signal processing circuit of claim 22, wherein a controller circuit of the processor selects an input signal from among the plurality of input terminals according to the connecting state of the set top box and the signal receiving state from the set top box.

25. The signal processing circuit of claim 22, wherein the user can select and output any of the signals received from the plurality of input terminals when signals are received from the set top box and at least one other device by the plurality of input terminals.

26. The signal processing circuit of claim 18, wherein the processor comprises an image processor, a video processor, and a controller, and wherein the controller controls the image processor to display an input mode of the inputted signal through an on-screen display whenever the signal is selected and outputted.

27. The signal processing circuit of claim 18, wherein the set top box comprises a plurality of input terminals, and wherein the processor is coupled to a set top box processor to control the selection from among the plurality of input terminals.

28. The signal processing circuit of claim 18, wherein the external device comprises at least one of an AV device, a DVD device, and an PC.

* * * * *